(12) United States Patent
Zanoni (10) Patent No.: US 9,837,654 B2
(45) Date of Patent: Dec. 5, 2017

(54) POWER CONNECTOR FOR A BATTERY MANAGEMENT SYSTEM

(71) Applicant: General Electric Company, Schenectady, NY (US)

(72) Inventor: Michael Stanley Zanoni, Glens Falls, NY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 14/507,908

(22) Filed: Oct. 7, 2014

(65) Prior Publication Data

US 2016/0099583 A1    Apr. 7, 2016

(51) Int. Cl.
| | | |
|---|---|---|
| H02J 7/00 | (2006.01) |
| H01M 10/42 | (2006.01) |
| H01M 2/20 | (2006.01) |
| H01R 13/46 | (2006.01) |
| H01R 103/00 | (2006.01) |
| H01R 4/56 | (2006.01) |
| H01R 24/68 | (2011.01) |

(52) U.S. Cl.
CPC .............. *H01M 2/20* (2013.01); *H01M 2/206* (2013.01); *H01M 10/425* (2013.01); *H01R 13/46* (2013.01); *H01M 2010/4271* (2013.01); *H01M 2220/10* (2013.01); *H01R 4/56* (2013.01); *H01R 24/68* (2013.01); *H01R 2103/00* (2013.01)

(58) Field of Classification Search
CPC ...... H02J 7/007; H01R 13/46; H01M 10/425; H01M 2/20
See application file for complete search history.

(56) References Cited

U.S. PATENT DOCUMENTS

| | | | |
|---|---|---|---|
| 8,179,092 B2 | 5/2012 | Timmons et al. | |
| 8,292,651 B1 * | 10/2012 | Lakeman | H01R 13/502 439/345 |
| 8,313,855 B2 | 11/2012 | Muis | |
| 8,354,186 B2 | 1/2013 | Muis | |
| 8,541,130 B2 | 9/2013 | Muis | |
| 8,691,409 B2 | 4/2014 | Shin et al. | |
| 8,786,261 B2 | 7/2014 | Andrea | |
| 8,808,031 B2 | 8/2014 | Zhao | |
| 2010/0112843 A1 * | 5/2010 | Heichal | B60K 1/04 439/299 |

* cited by examiner

*Primary Examiner* — Stewart Fraser
*Assistant Examiner* — Rachel L Zhang
(74) *Attorney, Agent, or Firm* — Dority & Manning, P.A.

(57) ABSTRACT

The present disclosure is directed to an improved energy storage system. The energy storage system includes an energy storage device having positive and negative terminals, a battery management system configured to monitor and control the energy storage device, and a power connector configured to electrically couple the battery management system with the energy storage device. The power connector includes a housing and positive and negative bus bars, each containing a positive and negative interface pin, respectively. The interface pins are operatively coupled to the positive and negative terminals of the energy storage device to form a power connection. The housing contains separate, opposing side walls defining an open passageway therebetween. Thus, the open passageway provides air cooling across the power connection.

20 Claims, 8 Drawing Sheets

POWER CONNECTOR FOR A BATTERY MANAGEMENT SYSTEM

FIELD OF THE INVENTION

The present subject matter relates generally to batteries and, more particularly, to battery-to-battery management system power connectors.

BACKGROUND OF THE INVENTION

Typically, the primary source of electrical power for a consuming entity, e.g. a telecommunications facility, is commercial power from a utility. However, for an off-grid or weak-grid telecom facility, the main power source may include an engine-generator set, e.g. a diesel generator, and a battery pack that can be used in backup situations. For example, if power from the commercial utility is lost, the diesel generator can be activated to supply power to the telecom facility. Start-up of the diesel generator, however, takes time; therefore, the battery pack provides power during this transitional time period. In addition, if the diesel generator fails to start (e.g., runs out of fuel, suffers a mechanical failure), then the battery pack is able to provide power for an additional period of time. Though diesel generators are inexpensive to install, the escalating cost of diesel fuel and its delivery to remote locations has driven the search for alternative, economical solutions.

For example, certain telecom facilities employ a diesel-battery hybrid power system to conserve fuel where the primary power source is a diesel generator. In such a scenario, a long, life-cycle battery is used to alternately share the site load with the diesel generator. More specifically, during operation, the diesel generator is modulated on and off and, when it is active, powers the facility and recharges the battery at an overall higher efficiency than if powering the facility alone. Once the battery is recharged, the generator can be turned off and the battery is used to sustain the facility load. Such hybrid power systems have achieved fuel savings of up to 50% in some applications.

The hybrid power system also typically includes a battery management system (BMS) configured to manage the battery pack by protecting the cells contained therein from operating outside a safe operating area, monitoring its state, calculating secondary data, reporting that data, and/or controlling the battery environment. Typical objectives of the BMS, for example, may include protecting the cells from damage, prolonging the life of the battery, and/or maintaining the battery in a proper operating state such that it can fulfil the functional requirements of the application for which it was specified.

Typically, the battery pack and the BMS are electrically coupled together via a power connector. Conventional power connectors contain multiple components, including at least a metal, die cast box, positive and negative bus bars each containing an interface pin, a thermal pad, and a plastic bus bar retainer. The thermal pad is located against a bottom surface of the metal box and the bus bars are configured atop the thermal pad such that the pins extend within the metal box. The plastic bus bar retainer maintains the pins in the proper location within the metal box. Oftentimes, however, the metal box acts as a heat sink by drawing heat in from the battery pack and rejecting it into the BMS. In addition, the thermal pad, due to its thin configuration, can be susceptible to failures as even the smallest piece of debris between the pad and the metal box can cause an electrical short.

In view of the aforementioned, an improved battery-to-BMS power connector would be desired in the art. Thus, the present disclosure is directed to a simplified power connector having less component parts, as well as improved air cooling across the power connection.

BRIEF DESCRIPTION OF THE INVENTION

Aspects and advantages of the invention will be set forth in part in the following description, or may be obvious from the description, or may be learned through practice of the invention.

In accordance with one aspect of the present disclosure, an improved energy storage system is disclosed. The energy storage system includes an energy storage device having positive and negative terminals, a battery management system configured to monitor and control the energy storage device, and a power connector configured at least partially within the battery management system. The power connector includes a housing, a positive bus bar, and negative bus bar. The positive bus bar includes a positive interface pin and the negative bus bar includes a negative interface pin. The positive and negative interface pins are electrically coupled to the positive and negative terminals of the energy storage device to form a power connection. The housing contains separate, opposing side walls defining an open passageway therebetween. Thus, the open passageway provides fluid communication between the battery management system and the energy storage device so as to improve air cooling across the power connection.

In one embodiment, the positive and negative bus bars are configured within one or more grooves of an exterior surface of the housing. In another embodiment, the positive and negative bus bars comprise an L-shaped cross-section. In still another embodiment, the energy storage system may also include one or more additional bus bars configured to electrically couple the positive and negative bus bars of the power connector to one or more electrical components of the battery management system. Thus, the L-shaped positive and negative bus bars combined with the additional bus bars provide improved air cooling across the power connection.

In another embodiment, the housing may be constructed of any suitable material, e.g. a plastic material. In still further embodiments, the housing of the power connector may be configured to mount against an interior wall of the battery management system. For example, in one embodiment, the housing may include one or more through holes configured through the opposing side walls such that the housing may be mounted to the interior wall of the battery management system via one or more fastening members. In addition, the housing may also include one or more alignment pins on one or more bottom edges of the opposing side walls. Thus, the alignment pins may be provided to locate the power connector against the interior wall of the battery management system, which may contain corresponding receiving holes for the alignment pins. Alternatively, the housing may include one or more alignment pins on one or more top edges of the opposing side walls. In such an embodiment, the one or more alignment pins are configured to locate a heat shield atop the power connector. Thus, the raised alignment pins may also provide additional space between the power connector and the optional heat shield to further improve air cooling between the power connector and the printed circuit board assembly ("PCBA") of the battery management system.

In additional embodiments, the energy storage system may also include at least one thermal locking washer configured to provide tension to either or both of the positive or negative interface pins. In yet another embodiment, the energy storage device of the energy storage system may be a lithium ion battery, a sodium nickel chloride battery, a sodium sulfur battery, a nickel metal hydride battery, a nickel cadmium battery, a fuel cell, or similar.

In another aspect, the present disclosure is directed to an improved power connector for electrically connecting an energy storage device to a battery management system. The power connector includes a housing having separate, opposing side walls defining an open passageway therebetween, a positive bus bar including a positive interface pin, and a negative bus bar including a negative interface pin. The positive and negative interface pins are configured to couple the battery management system to positive and negative terminals of the energy storage device so as to form a power connection. Further, when the power connector is electrically coupled between the battery management system and the energy storage device, the open passageway provides fluid communication therebetween so as to improve air cooling across the power connection. It should be understood that the power connector may also include any of the additional features as described herein.

In yet another aspect, the present disclosure is directed to an improved power connector for electrically connecting one or more electrical components. The power connector includes a housing having separate, opposing side walls defining an open passageway therebetween, at least one bus bar configured with an exterior surface of the housing, and at least one interface pin configured with the bus bar and extending between the opposing side walls. In addition, the interface pin is configured to couple a first electrical component to a second electrical component so as to form a power connection. Further, when the power connector is electrically coupled between the first and second electrical components, the open passageway provides fluid communication therebetween so as to improve air cooling across the power connection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an energy storage system having an improved power connector for electrically connecting an energy storage device to a battery management system ("BMS"). The power connector is configured at least partially within the BMS and includes a housing with positive and negative bus bars configured on an exterior surface thereof. The housing contains separate, opposing side walls defining an open passageway therebetween. The positive and negative bus bars each contain a positive and negative interface pin, respectively, which are configured to electrically connect to positive and negative terminals of the energy storage device to form a power connection. Further, the open passageway provides fluid communication between the battery management system and the energy storage device so as to improve air cooling across the power connection.

The present disclosure provides numerous advantages not present in the prior art. For example, the improved power connector reduces heat flow from the energy storage device, thereby improving the efficiency of the energy storage device. More specifically, the power connector of the present disclosure provides a simplified design that optimizes the contact area between the interface pins and the bus bars to allow for sufficient electrical contact, while also reducing heat flow with reduced contact area. In addition, the bus bars can free-float on the housing, thereby eliminating the heat drawing effect of the metal box. Further, the power connector reduces heat flow into the BMS which results in reduced BMS temperatures and a longer printed circuit board assembly ("PCBA") component life. Still additional benefits of the power connector include improved reliability (e.g. by eliminating the thermal pad) and a corresponding decrease in cost due to a reduction in component parts.

Figure 1:
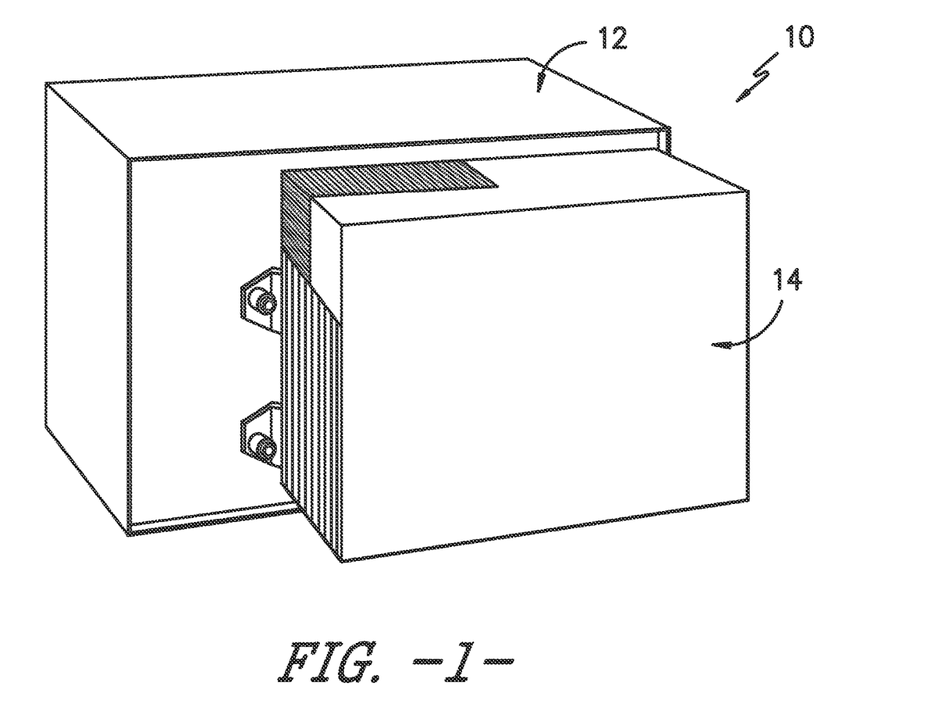
FIG. 1 illustrates a perspective view of one embodiment of an energy storage system according to the present disclosure.
Figure 2:
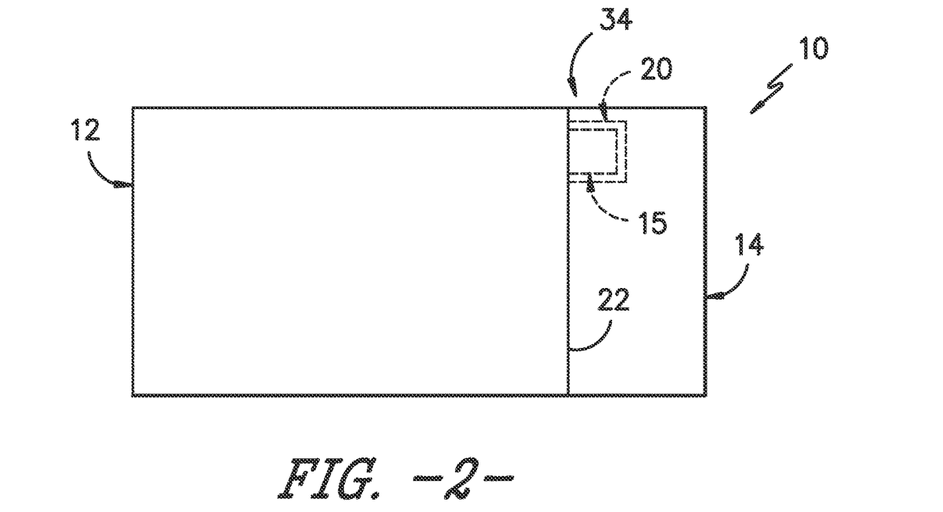
FIG. 2 illustrates a side view of one embodiment of an energy storage system according to the present disclosure.

Referring now to the drawings, FIGS. 1 and 2 illustrate a perspective view and a side view, respectively, of one embodiment of an energy storage system 10 according to the present disclosure. As shown, the energy storage system 10 includes at least one energy storage device 12 electrically coupled with a battery management system ("BMS) 14 via a power connector 20. More specifically, the energy storage device 12 has at least one battery terminal 15 configured to electrically couple with the power connector 20 configured within the BMS 14. In certain embodiments, for example, the power connector 20 is coupled to an internal wall 22 of the BMS 14 such that the battery terminal 15 can be electrically coupled therein. The BMS 14, as referred to herein, generally refers to any electronic system that manages the energy storage device 12. Thus, in several embodiments, the BMS 14 is configured to monitor and/or control operation of the energy storage device 12. More specifically, the BMS 14 may be configured to protect the energy storage device 12 from operating outside of safe operation, monitor its state, calculate and report data, control the operating environment, and/or any other suitable control actions needed for device protection. In addition, the energy storage device 12, as referred to herein, generally refers to any suitable energy storage device, such as e.g. a battery. More specifically, in certain embodiments, the energy storage device 12 may include at least one of a lithium ion battery, a sodium nickel chloride battery, a sodium sulfur battery, a nickel metal hydride battery, a nickel cadmium battery, a fuel cell, or similar.

Figure 3:
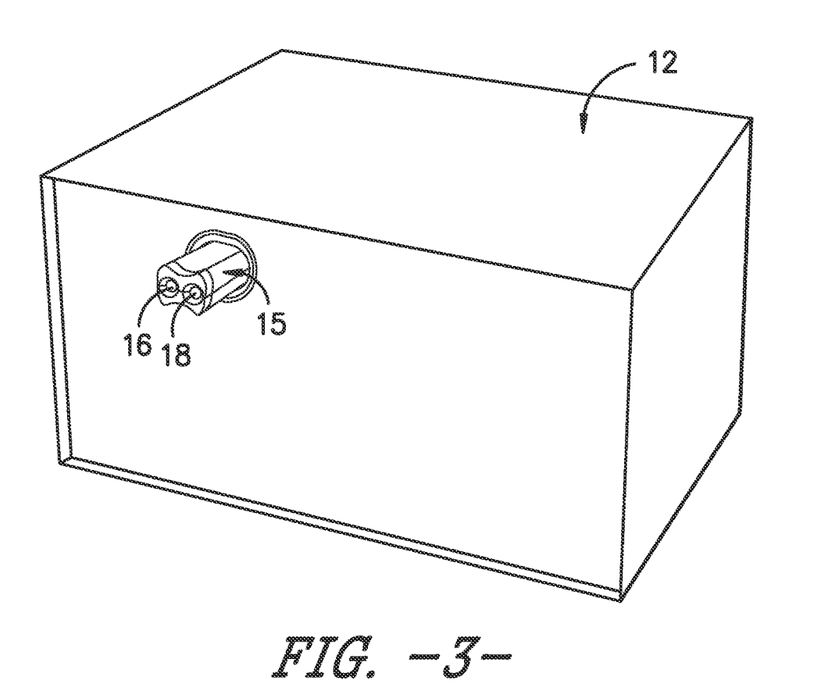
FIG. 3 illustrates a perspective view of one embodiment of an energy storage device according to the present disclosure.
Figure 4:
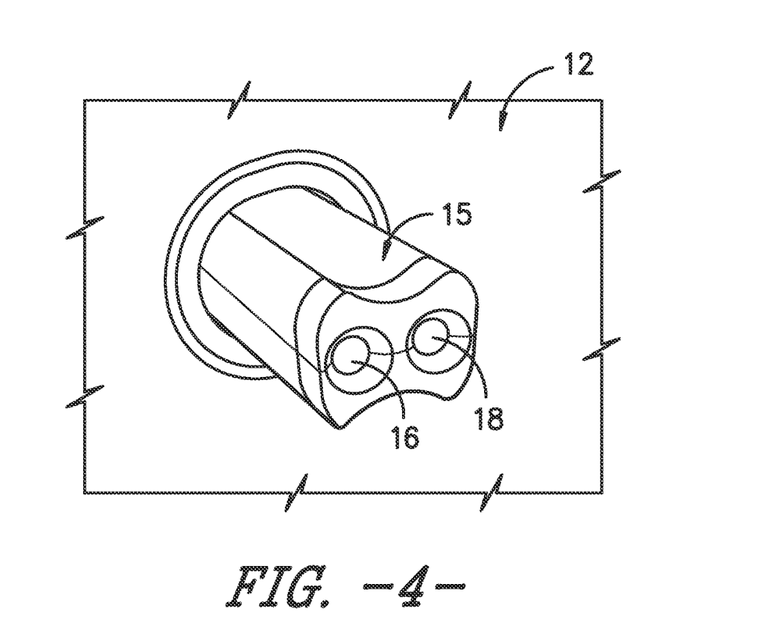
FIG. 4 illustrates a detailed view of the energy storage device of FIG. 3, particularly illustrating the positive and negative terminals of the energy storage device, according to the present disclosure.

Referring now to FIGS. 3 and 4, perspective views of one embodiment of the energy storage device 12 according to the present disclosure are illustrated. More specifically, FIG. 3 illustrates a perspective view of the entire energy storage device 12, whereas FIG. 4 illustrates a detailed view of the power connection port 15 of the energy storage device 12. As shown in the illustrated embodiment, the power connection port 15 has positive and negative terminals 16, 18. It should be understood by one of ordinary skill in the art that the power connection port 15 may further include any suitable electrical terminal known in the art for providing an electrical connection between two electrical components.

Referring now to FIGS. 5-9, various embodiments of the power connector 20 according to the present disclosure are illustrated. As shown, the power connector 20 includes a housing 24 configured to sit at least partially within the BMS 14. In addition, the housing 24 includes separate, opposing side walls 36, 38 defining an open passageway 40 therebetween. As such, the open passageway 40 is in fluid communication with both the internal BMS 14 components, as well as the energy storage device 12 so as to provide improved air cooling across the power connection 34. More specifically, due to the open configuration of the housing 24 (i.e. a two-sided housing 24 having an open passageway 40 as opposed to a closed-in four-sided housing), heat flow into the BMS 14 can be reduced and air cooling across the power connection 34 can be improved.

Referring particularly to FIGS. 2, 5, 10 and 11, the housing 24 of the power connector 20 may be configured against an interior wall 22 of the BMS 14. For example, in one embodiment, the side walls 36, 38 of the housing 24 may contain one or more through holes 23 configured therethrough such that the power connector 20 may be bolted to the interior wall 22 of the BMS 22 via one or more fastening members 27.

Figure 9:
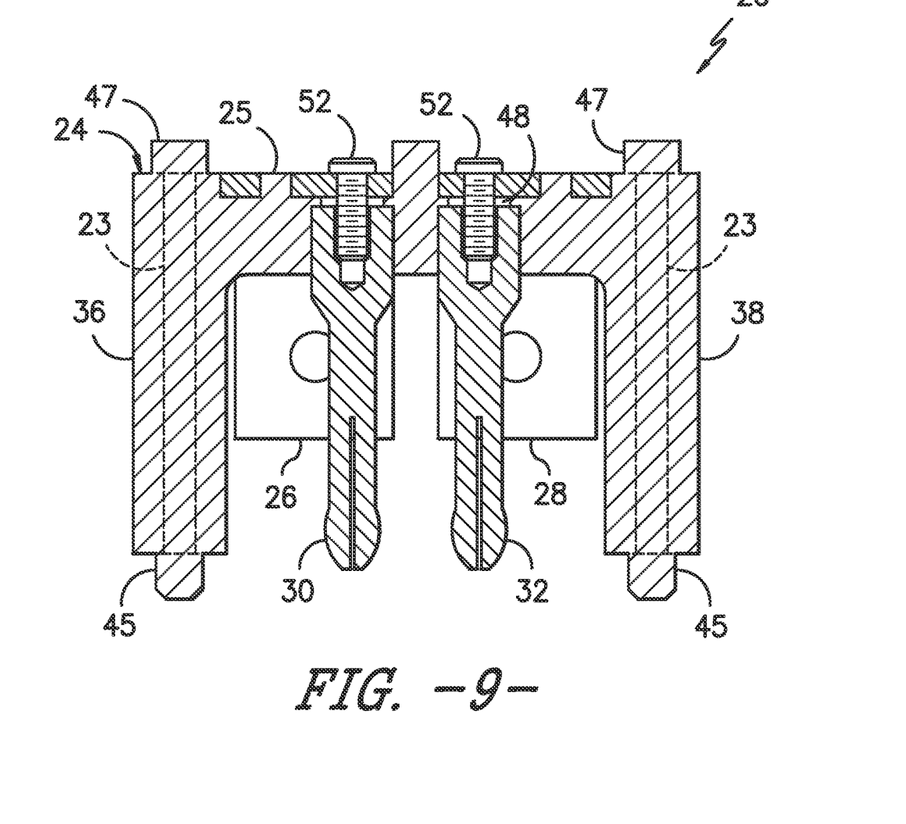
FIG. 9 illustrates a cross-sectional view of the embodiment of FIG. 8.

In addition, as shown in FIGS. 6-11, the power connector 20 includes one or more bus bars 126, 128 for providing an electrical connection between the BMS 14 and the energy storage device 12. For example, as shown, the housing 24 may include one or more grooves 42 in an exterior surface 25 thereof that are configured to receive the one or more bus bars 26, 28. Thus, in certain embodiments, the bus bars 26, 28 can free-float on the housing 24, thereby effectively increasing air cooling of the power connector 20. More particularly, as shown in the illustrated embodiment, a positive bus bar 28 and a negative bus bar 26 are configured within the grooves 42 of the housing 24. In addition, the positive bus bar 28 is electrically configured with a positive interface pin 32 and the negative bus bar 26 is electrically configured with a negative interface pin 30. More specifically, in one embodiment, the positive and negative bus bars 28, 26 are electrically configured with the positive and negative interface pins 32, 30 via one or more retaining bolts 52. As such, the negative and positive interface pins 30, 32 can be electrically coupled to the positive and negative terminals 16, 18 of the energy storage device 12 so as to form a power connection 34. In certain embodiments, the power connector 20 may also include at least one thermal locking washer 48 configured with the retaining bolts 52 to provide tension to either or both of the interface pins 30, 32 (FIG. 9).

Figure 5:
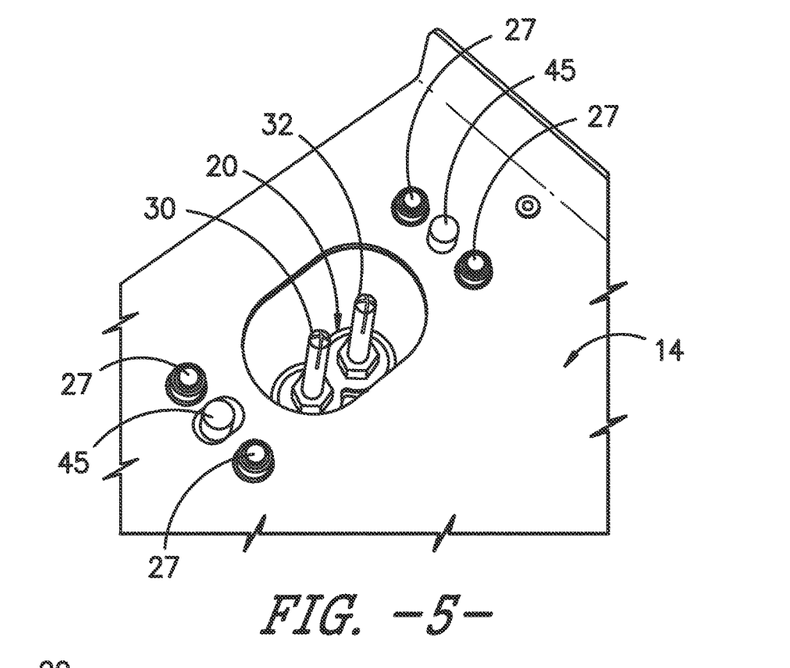
FIG. 5 illustrates a partial, perspective view of one embodiment of a battery management system, particularly illustrating a power connector configured within the battery management system, according to the present disclosure.
Figure 6:
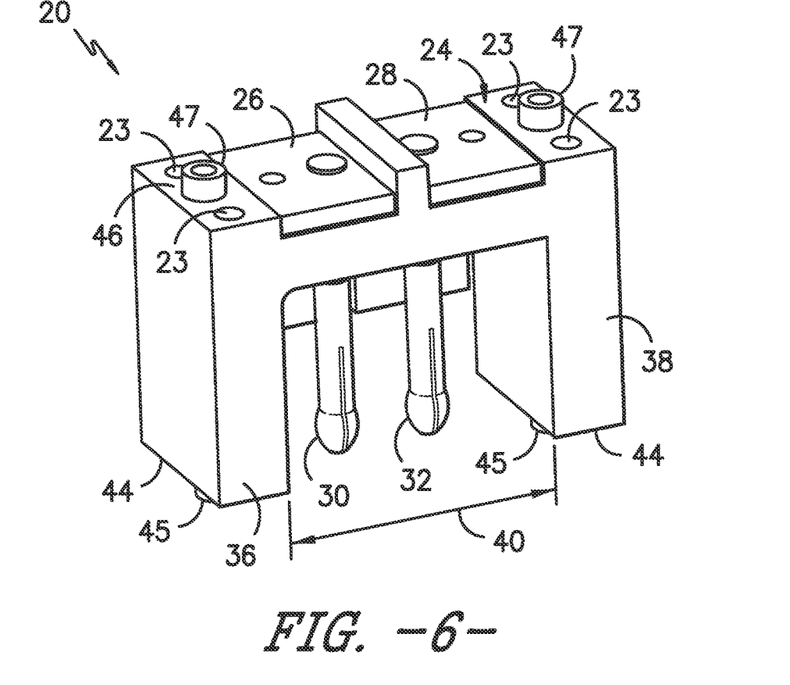
FIG. 6 illustrates a perspective view of one embodiment of a power connector according to the present disclosure.
Figure 7:
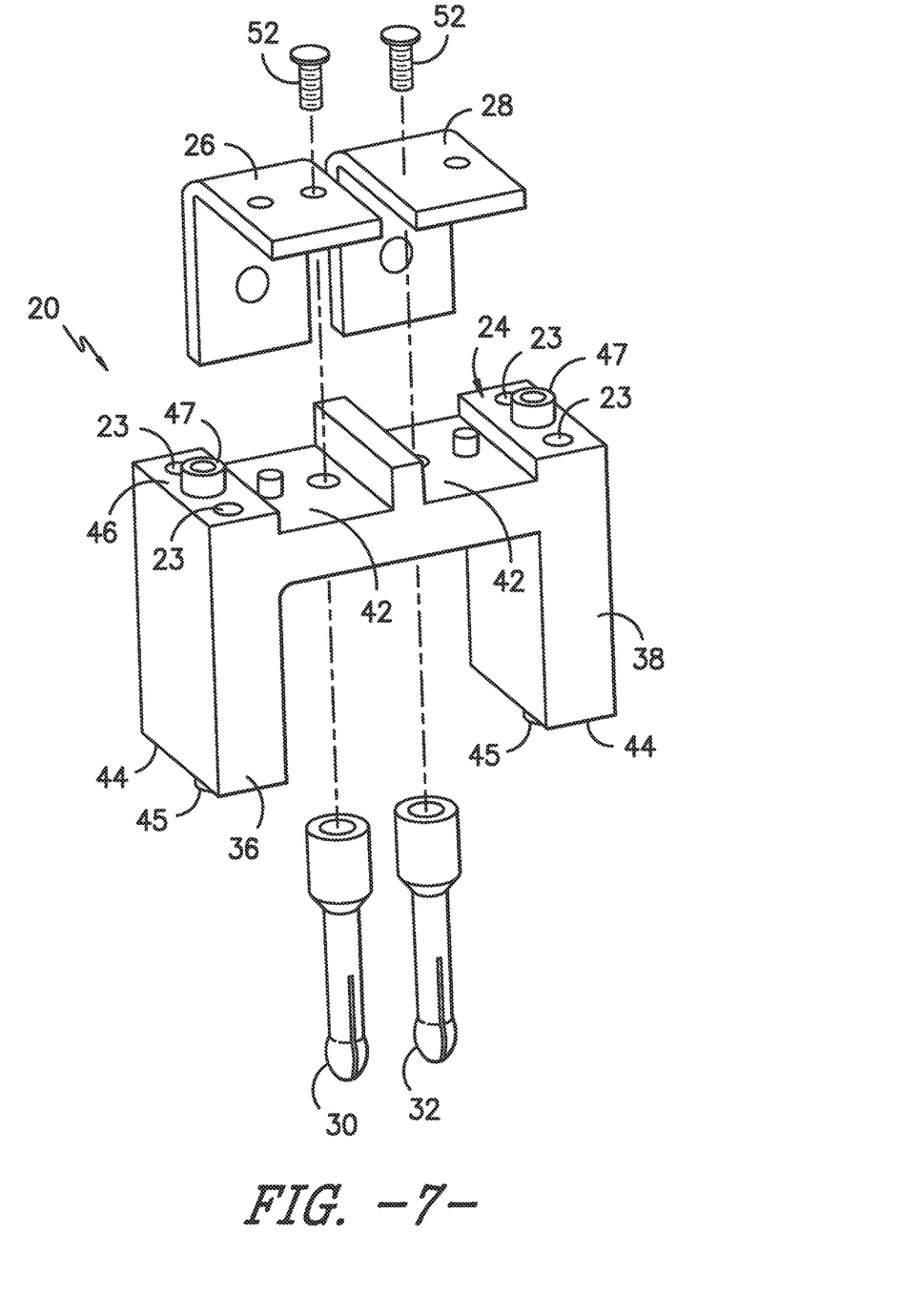
FIG. 7 illustrates an exploded view of one embodiment of a power connector according to the present disclosure.
Figure 8:
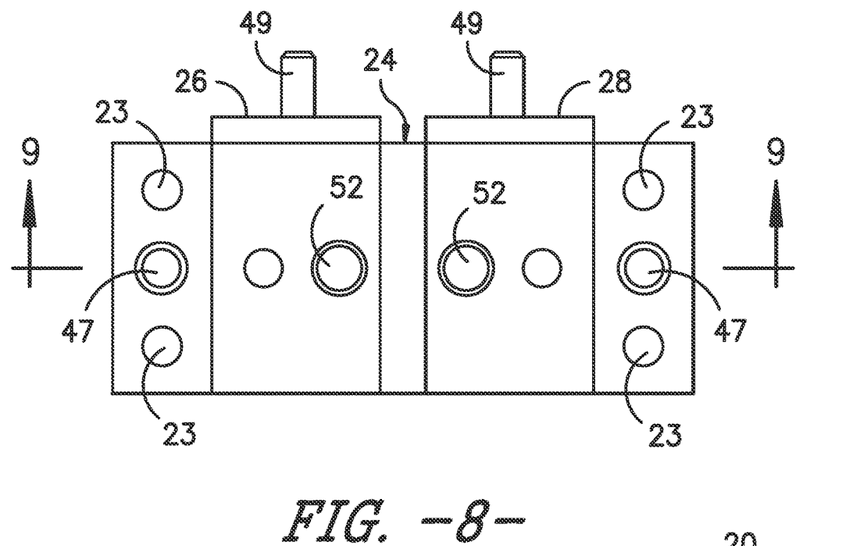
FIG. 8 illustrates a top view of one embodiment of a power connector according to the present disclosure.

Referring generally to FIGS. 6-11, the housing 24 may also include one or more alignment pins 45 on one or more bottom edges 44 of the opposing side walls 36, 38. For example, in a particular embodiment, the alignment pins 45 may be provided to locate the power connector 20 against the interior wall 22 of the BMS 14, which may contain corresponding receiving holes for the alignment pins 45, as shown in FIG. 5. Alternatively, the housing 24 may include one or more alignment pins 47 on one or more top edges 46 of the opposing side walls 36, 38. In such an embodiment, as shown in FIG. 12, the alignment pins 47 are configured to locate a heat shield 50 atop the power connector 20 so as to protect the printed circuit board assembly ("PCBA") of the BMS 14 from damage. More specifically, the raised alignment pins 47 may provide additional space between the power connector 20 and the optional heat shield 50 to further improve air cooling between the power connector 20 and the PCBA of the BMS 14.

Figure 10:
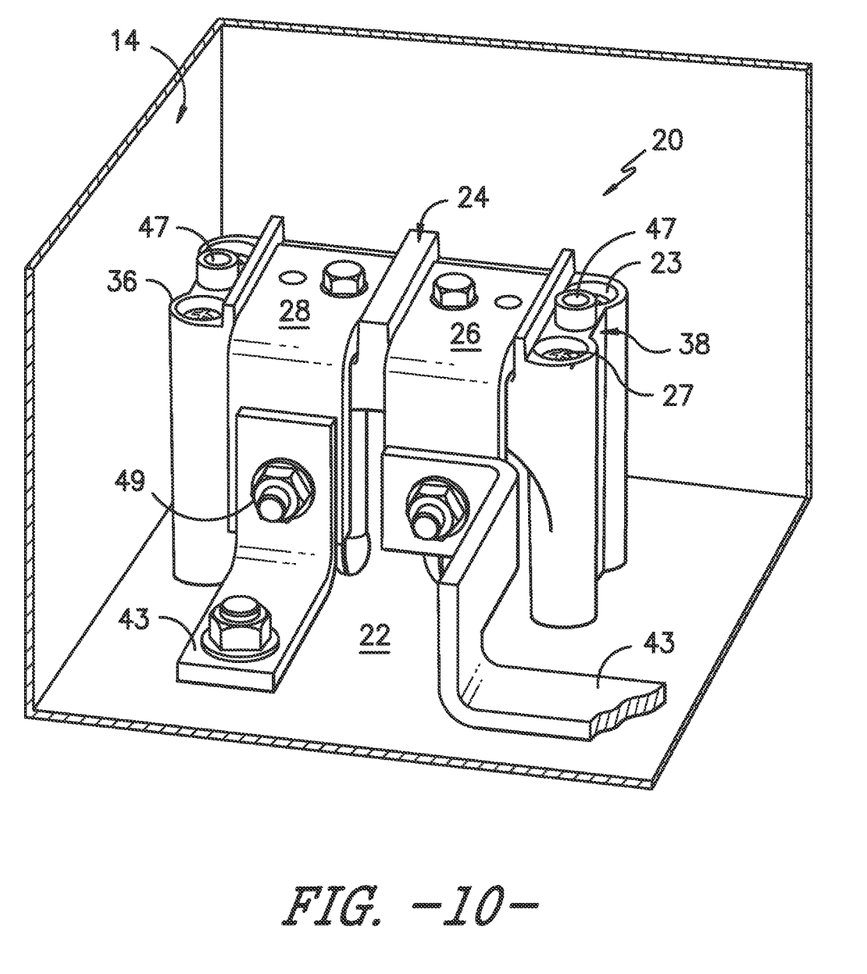
FIG. 10 illustrates a partial, perspective view of one embodiment of an energy storage system, particularly illustrating the power connector coupled against an internal wall of the battery management system, according to the present disclosure.
Figure 11:
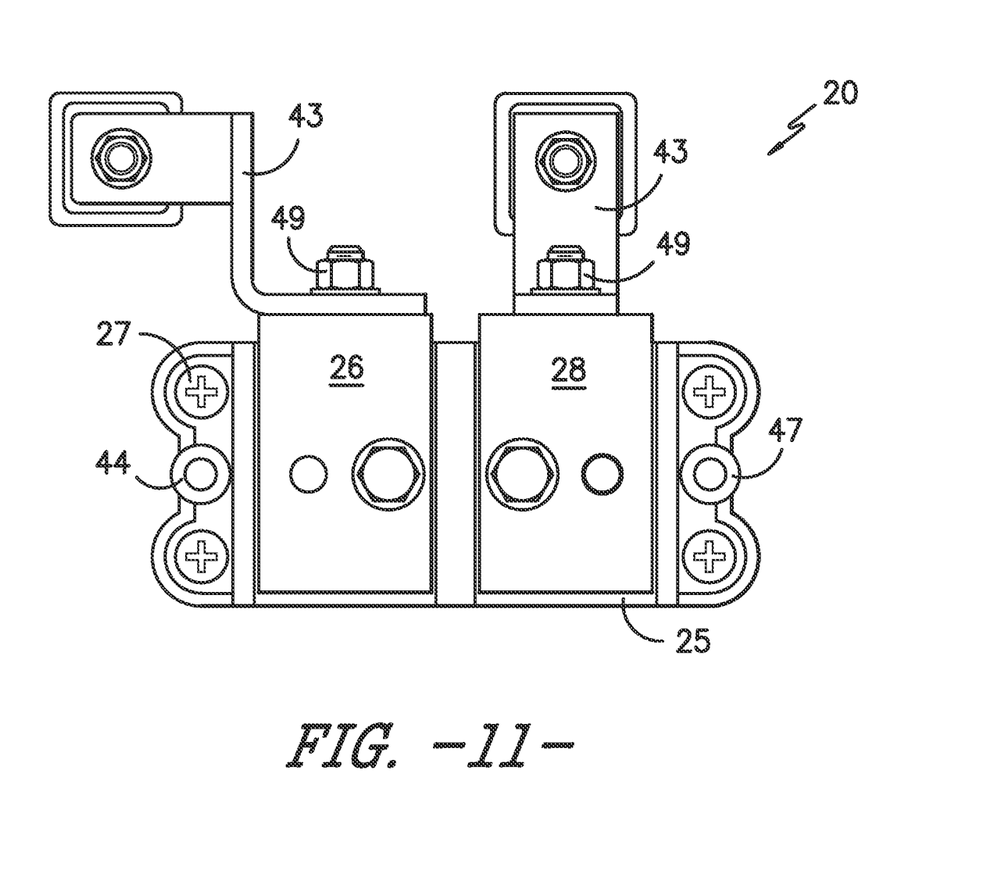
FIG. 11 illustrates a top view of the embodiment of FIG. 10.
Figure 12:
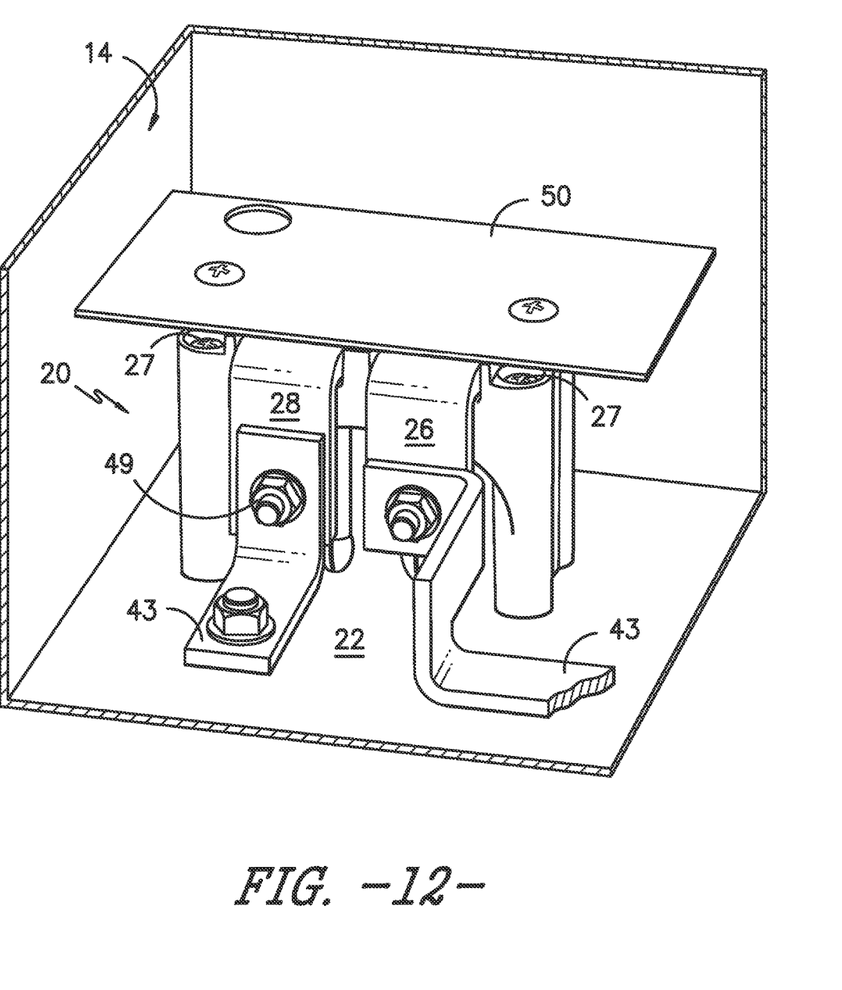
FIG. 12 illustrates a perspective view of one embodiment of a power connector, particularly illustrating a heat shield configured atop the power connector, according to the present disclosure.

Referring particularly to FIGS. 10-12, the negative and positive bus bars 26, 28 may be electrically coupled to one or more electrical components within the BMS 14 via one or more conductive members, e.g. additional bus bars 43. In addition, as shown, the bus bars 26, 28 may have an L-shaped cross-section such that the bus bars 26, 28 extend from a top surface of the housing 24 to a side surface of the housing 24. Thus, the bus bars 26, 28 may be electrically connected to the additional bus bars 43 via one or more fasteners 49 near a side surface of the housing 24. Such a configuration provides a clearance for the PCBA, which is typically located directly above the power connector 20. More specifically, in one embodiment, when the power connector 20 is installed within the BMS 14, the bus bars 26, 28 may be angled downward relative to the top surface of the housing 24 such that the screw heads of the fasteners 49 are away from the PCBA. In such an embodiment, the L-shaped bus bars 26, 28 and the additional bus bars 43 provide increased air cooling across the power connection 34. Alternatively, the bus bars 26, 28 may have any other suitable cross-sectional shape, including for example, a rectangular cross-section. In such an embodiment, the bus bars 26, 28 may extend outward from the top surface of the housing 24.

It should be understood that the housing 24 of the power connector 20 may be constructed of any suitable material. For example, in a particular embodiment, the housing 24 is constructed of a plastic or polymeric material. More specifically, in a preferred embodiment, the housing 24 may be constructed of a mineral-filled polyphenylene sulfide (PPS). In still further embodiments, any plastic or polymeric material having suitable thermal, electrical, and/or mechanical properties may be used to construct the housing 24. In addition, in certain embodiments, the selected material may be flame resistant.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy storage system, comprising:
   an energy storage device comprising positive and negative terminals;
   a battery management system configured to monitor and control the energy storage device; and,
   a power connector comprising a housing, a positive bus bar, and negative bus bar, the positive bus bar comprising a positive interface pin and the negative bus bar comprising a negative interface pin, the positive and negative interface pins being electrically coupled to the positive and negative terminals of the energy storage device to form a power connection, the housing comprising separate, opposing side walls defining an open passageway therebetween, each of the opposing side walls defining a bottom edge that abuts against and mounts to an interior wall of the battery management system, the positive and negative interface pins terminating within the open passageway between the opposing side walls so as to not extend past the interior wall of the battery management system,
   wherein the open passageway provides fluid communication between the battery management system and the energy storage device so as to improve air cooling across the power connection.

2. The energy storage system of claim 1, wherein the power connector is configured at least partially within the battery management system.

3. The energy storage system of claim 1, wherein the positive and negative bus bars are configured within one or more grooves of an exterior surface of the housing.

4. The energy storage system of claim 3, wherein the positive and negative bus bars comprise an L-shaped cross-section.

5. The energy storage system of claim 4, further comprising one or more additional bus bars configured to electrically connect the power connector to one or more components of the battery management system via the positive and negative bus bars.

6. The energy storage system of claim 1, wherein the housing of the power connector is mounted against the interior wall of the battery management system.

7. The energy storage system of claim 6, wherein the housing further comprises one or more alignment pins located on the bottom edges of the opposing side walls, the one or more alignment pins configured to locate the power connector against the interior wall of the battery management system.

8. The energy storage system of claim 1, wherein the housing further comprises one or more alignment pins on one or more top edges of the opposing side walls, the one or more alignment pins configured to locate a heat shield atop the power connector.

9. The energy storage system of claim 1, further comprising at least one thermal locking washer configured to provide tension to at least one of the positive interface pin or the negative interface pin.

10. The energy storage system of claim 1, wherein the housing is constructed of a plastic material.

11. The energy storage system of claim 1, wherein the energy storage device comprises at least one of a lithium ion battery, a sodium nickel chloride battery, a sodium sulfur battery, a nickel metal hydride battery, a nickel cadmium battery, or a fuel cell.

12. The power connector of claim 11, wherein the housing is constructed of a plastic material.

13. A power connector for connecting an energy storage device to a battery management system, the power connector comprising:
   a housing comprising separate, opposing side walls defining an open passageway therebetween, each of the opposing side walls defining a bottom edge that abuts against and mounts to an interior wall of the battery management system;
   a positive bus bar comprising a positive interface pin; and
   a negative bus bar comprising a negative interface pin, the positive and negative interface pins configured to electrically couple the battery management system to positive and negative terminals of the energy storage device to form a power connection, the positive and negative interface pins terminating within the open passageway between the opposing side walls so as to not extend past the interior wall of the battery management system when the bottom edges of the opposing side walls are mounted thereto,
   wherein, when the power connector is electrically coupled between the battery management system and the energy storage device, the open passageway provides fluid communication therebetween so as to improve air cooling across the power connection.

14. The power connector of claim 13, wherein the positive and negative bus bars are configured within one or more grooves of an exterior surface of the housing.

15. The power connector of claim 14, wherein the positive and negative bus bars comprise an L-shaped cross-section.

16. The power connector of claim 13, wherein the housing of the power connector is mounted against the interior wall of the batter management system.

17. The power connector of claim 16, wherein the housing further comprises one or more alignment pins located on the bottom edges of the opposing side walls, the one or more alignment pins configured to locate the power connector against the interior wall of the battery management system.

18. The power connector of claim 13, wherein the housing further comprises one or more alignment pins on one or more top edges of the opposing side walls, the one or more alignment pins configured to locate a heat shield atop power connector.

19. The power connector of claim 13, further comprising at least one thermal locking washer configured to provide tension to at least one of the positive interface pin or the negative interface pin.

20. A power connector, comprising:
 a housing comprising separate, opposing side walls defining an open passageway therebetween, each of the opposing side walls defining a bottom edge that abuts against and mounts to an interior wall of a battery management system;
 at least one bus bar configured with an exterior surface of the housing; and,
 at least one interface pin configured with the bus bar, the interface pin terminating within the open passageway and extending between the opposing side walls so as to not extend past the interior wall of the battery management system when the bottom edges of the opposing side walls are mounted thereto, the at least one interface pin configured to couple a first electrical component to a second electrical component so as to form a power connection,
 wherein, when the power connector is electrically coupled between the first and second electrical components, the open passageway provides fluid communication therebetween so as to improve air cooling across the power connection.

* * * * *